United States Patent
Tsukamoto et al.

(10) Patent No.: US 8,971,972 B2
(45) Date of Patent: Mar. 3, 2015

(54) POWER SAVINGS MODE MANAGEMENT OF WIRELESS COMMUNICATION TERMINAL BASED ON DATA COMMUNICATION RATE

(75) Inventors: Tadashi Tsukamoto, Tokyo (JP); Tomoyuki Tanaka, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 1196 days.

(21) Appl. No.: 12/375,665

(22) PCT Filed: Jul. 31, 2007

(86) PCT No.: PCT/JP2007/065015
§ 371 (c)(1), (2), (4) Date: Jan. 29, 2009

(87) PCT Pub. No.: WO2008/018328
PCT Pub. Date: Feb. 14, 2008

(65) Prior Publication Data
US 2009/0291713 A1 Nov. 26, 2009

(30) Foreign Application Priority Data
Aug. 11, 2006 (JP) ................... 2006-220060

(51) Int. Cl.
H04B 7/00 (2006.01)
H04B 1/38 (2006.01)
(Continued)

(52) U.S. Cl.
CPC ............ *H04W 28/22* (2013.01); *H04W 52/029* (2013.01); *Y02B 60/50* (2013.01)
USPC ......... 455/574; 455/572; 455/522; 455/127.5

(58) Field of Classification Search
CPC .............. H04W 52/00; H04W 52/029; H04W 52/0293; H04W 28/22; Y02B 60/50

USPC .................. 455/13.4, 574, 522, 127.5, 343.1, 455/343.5, 127.1, 552.1, 553.1; 340/7.32, 340/855.8
See application file for complete search history.

(56) References Cited

U.S. PATENT DOCUMENTS 7,162,279 B2 * 1/2007 Gupta .......................... 455/574
7,499,734 B2 * 3/2009 Kogure ........................ 455/574
(Continued)

FOREIGN PATENT DOCUMENTS

| JP | 2000032081 A | 1/2000 |
|----|----|----|
| JP | 2003274010 A | 9/2003 |

(Continued)

OTHER PUBLICATIONS

Supplementary European Search Report for EP 07 79 1699 completed Nov. 20, 2009.
(Continued)

*Primary Examiner* — Nizar Sivji
(74) *Attorney, Agent, or Firm* — Sughrue Mion, PLLC

(57) ABSTRACT

Object of the invention is to provide a wireless communication terminal having power saving control function that does not affect performance during high-speed communication. The wireless communication terminal comprises a processor that has a power saving control function for reducing the operating clock under a predetermined condition; and a wireless communication unit capable of carrying out communication at a high or low data communication rate wherein, when communication is carried out at the high data communication rate such as HSDPA, the power saving control function of the processor is turned off and the switching of the operating clock to the low clock is prohibited.

16 Claims, 8 Drawing Sheets

(51) Int. Cl.
*H04W 28/22* (2009.01)
*H04W 52/02* (2009.01)

(56) References Cited

U.S. PATENT DOCUMENTS

| | | | |
|---|---|---|---|
| 7,898,994 B2* | 3/2011 | Zhao et al. | 370/311 |
| 7,916,751 B2* | 3/2011 | Reznik et al. | 370/469 |
| 2003/0083097 A1* | 5/2003 | Kim | 455/553 |
| 2004/0135642 A1* | 7/2004 | Ishii | 331/16 |
| 2004/0192412 A1 | 9/2004 | Ono et al. | |
| 2004/0203834 A1* | 10/2004 | Mahany | 455/453 |
| 2004/0204181 A1* | 10/2004 | Cromer et al. | 455/574 |
| 2005/0099961 A1* | 5/2005 | Holma | 370/252 |
| 2005/0101283 A1* | 5/2005 | Kimata | 455/336 |
| 2005/0250452 A1* | 11/2005 | Walton et al. | 455/63.4 |
| 2006/0205443 A1* | 9/2006 | Simoens et al. | 455/574 |
| 2007/0060142 A1* | 3/2007 | Reznik et al. | 455/445 |
| 2007/0132751 A1* | 6/2007 | Claessen | 345/211 |
| 2007/0140199 A1* | 6/2007 | Zhao et al. | 370/338 |

FOREIGN PATENT DOCUMENTS

| | | |
|---|---|---|
| JP | 2005142981 A | 6/2005 |
| JP | 2006072991 A | 3/2006 |
| JP | 2006173778 A | 6/2006 |
| WO | 0150780 A | 7/2001 |
| WO | 2006016652 A1 | 2/2006 |

OTHER PUBLICATIONS

International Search Report for PCT/JP2007/065015 mailed Sep. 4, 2007.

* cited by examiner

POWER SAVINGS MODE MANAGEMENT OF WIRELESS COMMUNICATION TERMINAL BASED ON DATA COMMUNICATION RATE

INCORPORATION BY REFERENCE

This application is the National Phase of PCT/JP2007/065015, filed Jul. 31, 2007, which claims priority to Japanese Patent Application No. 2006-220060, filed on Aug. 11, 2006, which is hereby incorporated by reference herein in its entirety.

TECHNICAL FIELD

The present invention relates to a wireless communication terminal, a processor thereof, and a wireless communication terminal power management method, and more particularly to a wireless communication terminal that has the power saving control function (power management function) that moves the wireless communication terminal to a low power-consumption state under a predetermined condition, a processor thereof, and a wireless communication terminal power management method.

BACKGROUND ART

On a mobile phone or a PDA (Personal Digital Assistant) that is driven by a battery, the power saving control function is widely used that moves the mobile phone or the PDA to a low power consumption state under a predetermined condition. For example, Japanese Patent Kokai Publication No. JP2005-142981A discloses a mobile communication terminal with multiple processors that places the application control CPU (ACPU), primarily used for application management control, in a low power state (power saving mode) when data processing is not performed and the communication control CPU (CCPU), primarily used for communication function management control, in a low power state (power saving mode) when data communication is not carried out (see paragraph 0006).

In addition, Japanese Patent Kokai Publication No. JP 2006-72991A discloses a configuration in which, in view of the fact that switching to the low power state (power saving mode), if performed too frequently, decreases the power consumption saving effect, the operation mode is switched considering a loss involved in the transition processing and return processing of the operation mode.

Patent Document 1:
Japanese Patent Kokai Publication No. JP2005-142981A
Patent Document 2:
Japanese Patent Kokai Publication No. JP2006-72991A

DISCLOSURE OF THE INVENTION

Problems To Be Solved By The Invention

The disclosures of Patent Documents 1 and 2 are hereby incorporated in this specification by reference thereto.

For a wireless communication terminal, the environment is being established to allow it to use a higher-speed communication method in superposition (or combination) with the existing communication method. For example, in addition to the method in which Dedicated Physical Channel (DPCH) is used, HSDPA (High Speed Downlink Packet Access) communication function, which enables multiple terminals to share a high-speed, large-capacity down link for high-speed packet transfer and HSUPA (High Speed Uplink Packet Access) for use in uplink communication will be implemented into a mobile phone.

This type of high-speed packet communication methods involves a large amount of signal processing and, in this case, the power saving control function provided in a wireless communication terminal, if enabled, generates an extra load and affects the performance of the communication itself. The following describes this point.

As described in Patent Document 2, the transition to, and return from, the low power state (power saving mode) consumes a certain amount of time and power. For example, when the operating clock is reduced to create the low power state (power saving mode) and if an interrupt is generated because a task is generated in the power saving mode as shown in FIG. 7, the stabilizing time (for example, 100 μs) is required until the moment the clock is returned to the normal, high-speed clock and, during this period of time, an overhead is generated.

FIG. 8 is a diagram showing the state in which an interrupt instruction is generated on a mobile phone terminal compatible with HSDPA. There is no problem in a non-HSDPA area because the processing power is not required so much. However, though the mobile phone terminal moves less frequently to the above-described low power state (power saving mode) during the HSDPA communication, moving to the power saving mode when the processing power is not enough has the following problem; that is, the processing is further delayed because various types of monitoring (judgment) is required for setting the power saving mode and, in addition, the overhead for returning to the normal mode is generated as described above.

The technology disclosed in Patent Document 2 has the same problem. That is, because the prediction processing is required for judging whether the operation mode should be changed, the power consumption itself cannot be reduced, and the load during the high-speed packet communication described above is further increased, unless a processor having enough power is installed.

In view of the foregoing, it is an object of the present invention to provide a wireless communication terminal, which has the power saving control function that does not degrade the performance during high-speed communication, and a wireless communication terminal processor that implements the function.

Means To Solve The Problems

According to a first aspect of the present invention, there is provided a wireless communication terminal, comprising: a processor that has a power saving control function for reducing an operating clock under a predetermined condition; and a wireless communication unit capable of carrying out communication at a high or low data communication rate wherein, when communication is carried out at the high data communication rate, the power saving control function of the processor is turned off (the switching of the operating clock to the low clock is prohibited) (mode 1).

According to a second aspect of the present invention, there is provided a wireless communication terminal processor for use installed on a wireless communication terminal; the wireless communication terminal comprising a wireless communication unit capable of carrying out communication at a high or low data communication rate, and a power saving control function for reducing an operating clock under a predetermined condition; wherein, when communication is carried out at the high data communication rate, the power saving control function of the processor is turned off (the switching of the operating clock to the low clock is prohibited).

According to a third aspect of the present invention, there is provided a power management method for use on a wireless communication terminal comprising a processor that has a power saving control function for reducing an operating clock under a predetermined condition; and a wireless communication unit capable of carrying out communication at a high or low data communication rate wherein the processor recognizes a data communication rate of the wireless communication unit and, when the wireless communication unit carries out communication at the high data communication rate, the power saving control function of the processor is turned off.

Means To Solve The Problems

The present invention reduces an extra load on the processor during high-speed communication and increases the performance during high-speed communication.

EFFECT OF THE INVENTION

EXPLANATION OF SIGNS

Figure 1:
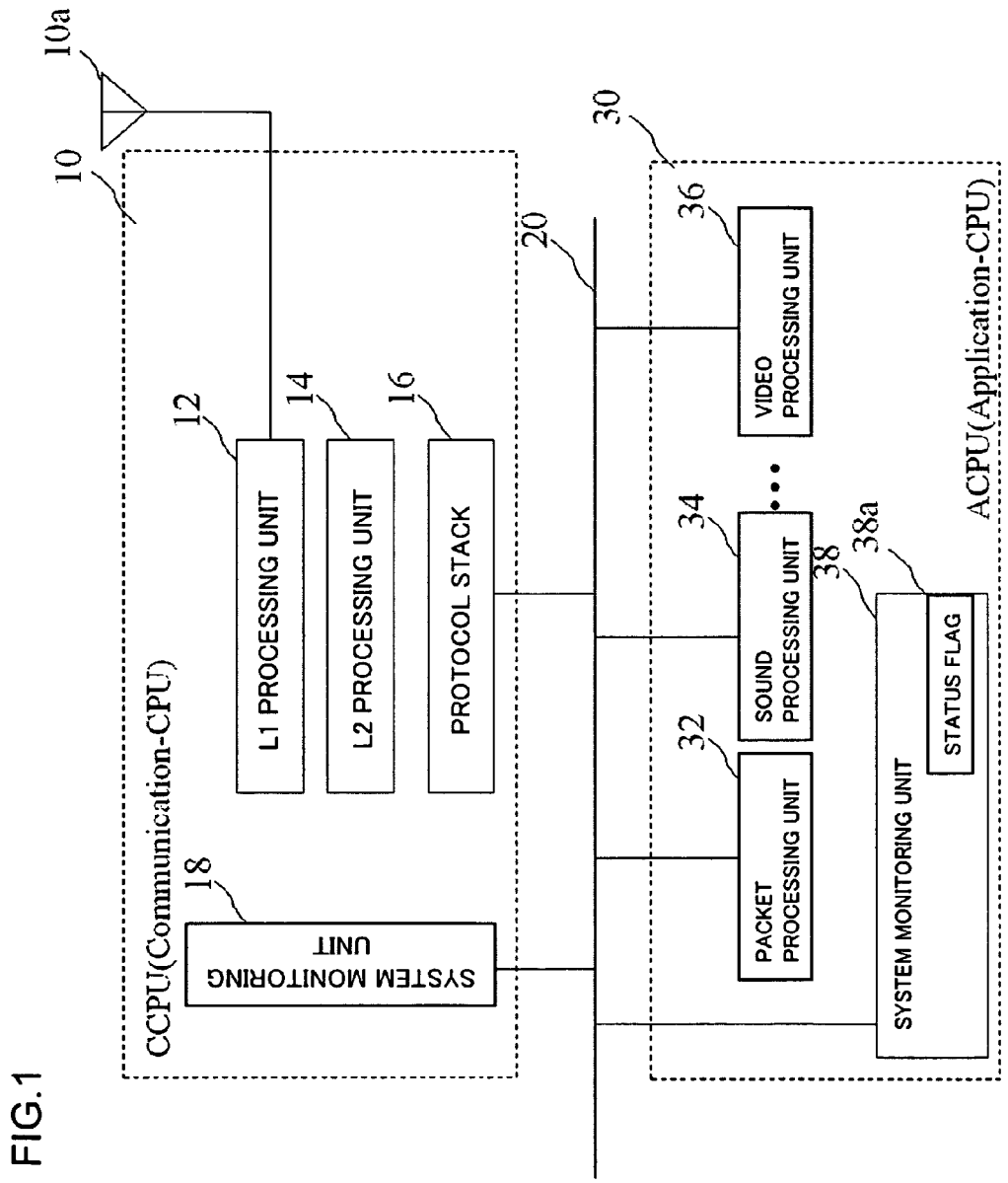
FIG. 1 is a logical block diagram showing a configuration of a mobile phone in a first exemplary embodiment of the present invention.

10a Antenna
10 CCPU (Communication-CPU)
12 L1 processing unit
14 L2 processing unit
16 Protocol stack
18 System monitoring unit
20 Logical bus
30 ACPU (Application-CPU)
32 Packet processing unit
34 Sound processing unit
36 Video processing unit
38 System monitoring unit
38a Status flag

PREFERRED MODES FOR CARRYING OUT THE INVENTION

In the first aspect of the present invention, the following modes are useful.

The wireless communication terminal comprises a communication processor that performs communication processing at the high or low data communication rate; and an application execution processor that executes tasks that process data received or sent via the communication processor wherein, when there is no task to be executed by the application execution processor, the power saving control function is implemented by the application execution processor moving to a power saving mode in which the operating clock is reduced, and the application execution processor prohibits a transition to the power saving mode when the communication processor is carrying out communication at the high data communication rate (mode 2).

The wireless communication terminal is compatible at least with HSDPA (High Speed Downlink Packet Access) communication and, during the HSDPA communication, the power saving control function of the processor is turned off (mode 3).

The wireless communication terminal is compatible at least with HSUPA (High Speed Uplink Packet Access) communication and, during the HSUPA communication, the power saving control function of the processor is turned off (mode 4).

The power saving control function is turned off at communication start time and, after that, the power saving control function is turned on when communication is started at the low data communication rate (mode 5).

The power saving control function is turned off at communication start time and, after that, the power saving control function is maintained off when communication is started at the high data communication rate (mode 6).

The power saving control function is turned on or off by rewriting a status flag that controls the processor (mode 7).

Note that the modes described above are applicable to, and useful for, the second and third aspects.

First Exemplary Embodiment

Next, preferred modes for carrying out the present invention will be described in detail with reference to the drawings. FIG. 1 is a logical block diagram showing the configuration of a mobile phone in a first exemplary embodiment of the present invention. Referring to FIG. 1, the mobile phone comprises a CCPU (Communication-CPU) 10 that primarily controls the communication system and functions as the communication control unit, an ACPU (Application-CPU) 30 that performs various types of non-communication processing and primarily functions as the application control unit, and a logical bus 20 that connects both CPUs. In FIG. 1, a memory device, an external interface, and a clock switching unit are omitted.

The CCPU 10, connected to an antenna 10a, comprises an L1 processing unit 12 that performs the processing of protocol layer 1, an L2 processing unit 14 that performs the processing of protocol layer 2, a protocol stack 16 that corresponds to the various communication protocols including HSDPA and R99 (Release99 W-CDMA), and a system monitoring unit 18.

The ACPU 30 comprises the units that perform various types of processing using data received from the CCPU 10 via the logical bus 20, such as a packet processing unit 32, a sound processing unit 34, a video processing unit 36, and a system monitoring unit 38. When an HSDPA wireless channel is established or released, the ACPU 30 updates a status flag 38a in the system monitoring unit 38 of the ACPU 30 based on the HSDPA communication status information broadcast from the protocol stack 16 of the CCPU 10 to the logical bus 20.

Figure 2:
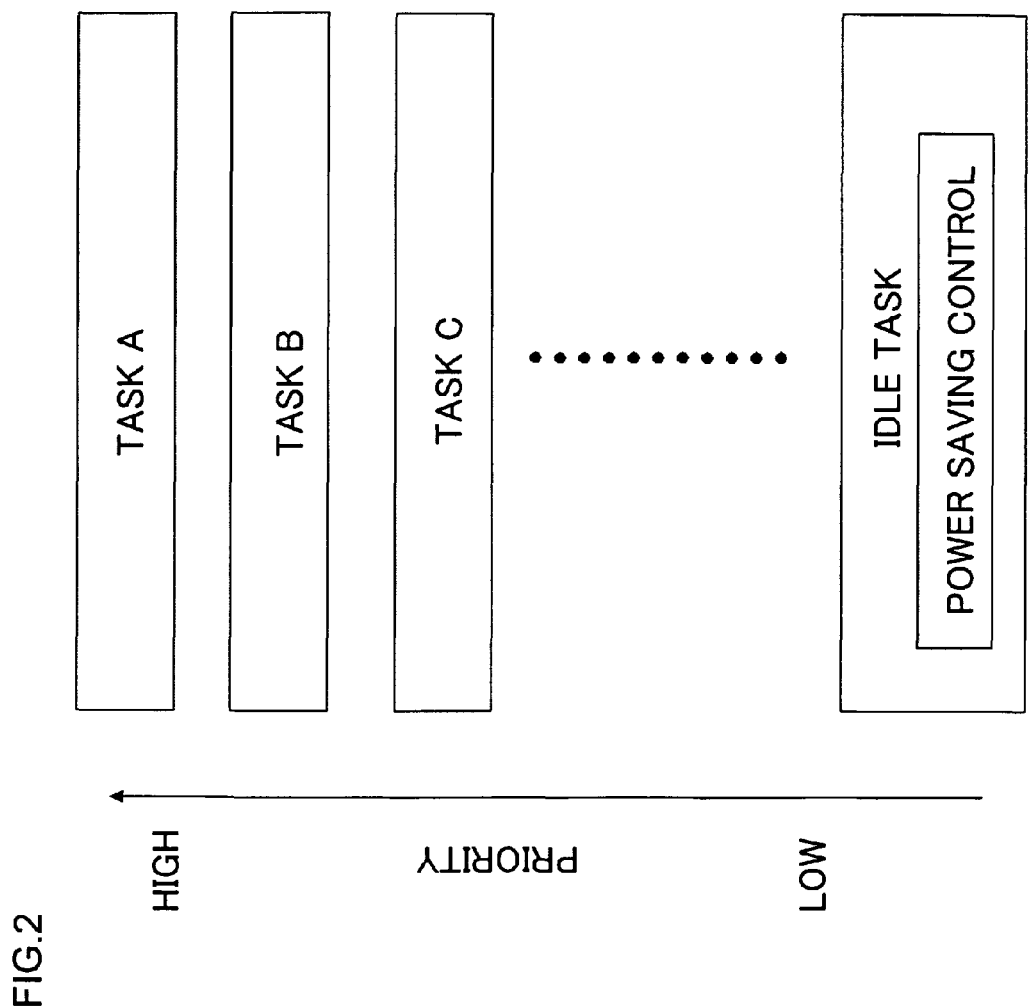
FIG. 2 is a diagram showing priority of tasks executed by an ACPU 30 of the mobile phone in the first exemplary embodiment of the present invention.

FIG. 2 is a diagram showing the priority of tasks executed in the ACPU 30. The ACPU 30 executes tasks based on the priorities assigned to the tasks. An IDLE task, shown at the bottom of the figure, is a task executed when there are no other tasks to be executed, and a power saving control, which will be described later, is executed in this task.

Figure 3:
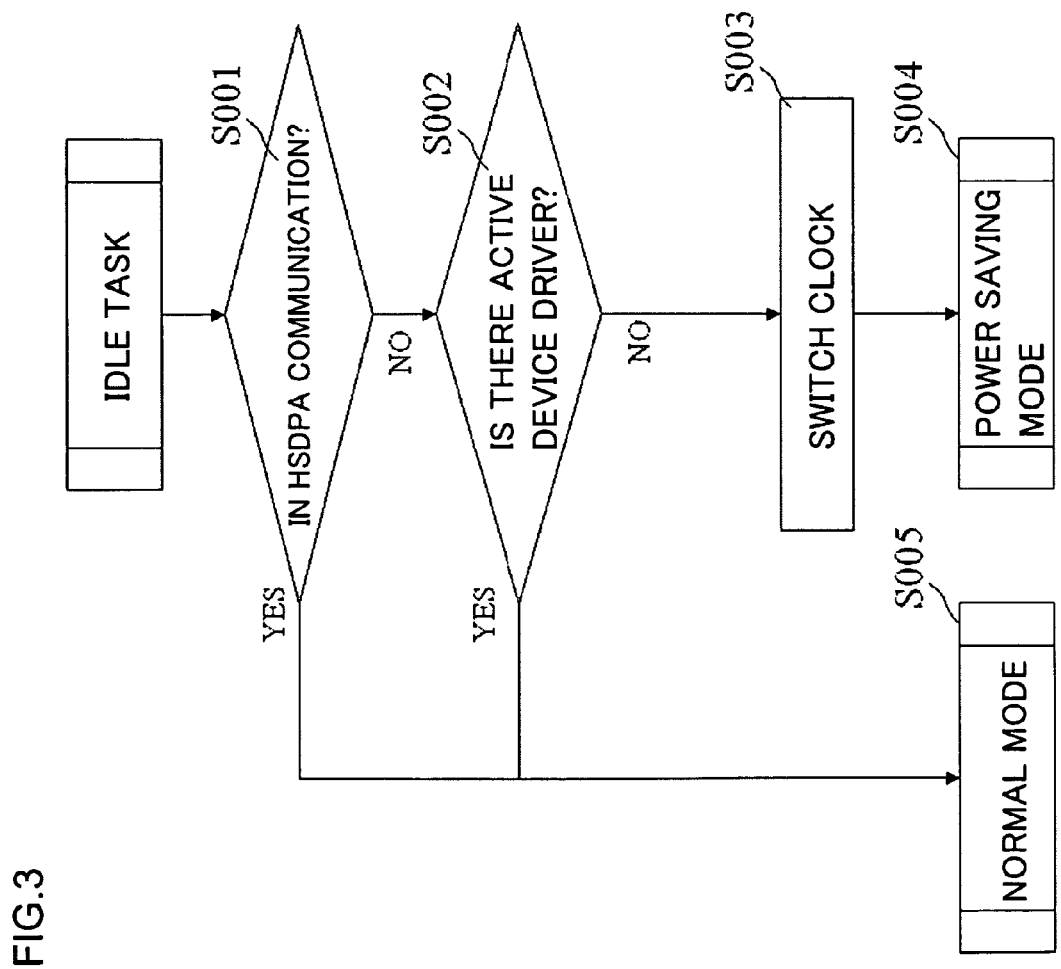
FIG. 3 is a diagram showing a processing flow executed by an IDLE task of the mobile phone in the first exemplary embodiment of the present invention.

The following describes in detail the processing executed by the IDLE task described above with reference to the drawings. FIG. 3 is a diagram showing the processing flow executed by the IDLE task. Referring to FIG. 3, the status flag 38a in the system monitoring unit 38 in the ACPU is referenced to check if the HSDPA communication is in the operation (step S001).

If it is judged in step S001 that HSDPA communication is in the operation, a normal mode (operating clock: high) is retained and the operating clock is not switched (step S005). Therefore, in case where the HSDPA communication is being carried out, the clock switching overhead does not occur when a task is generated during the HSDPA communication and the task is executed immediately.

On the other hand, if it is judged in step S001 that the HSDPA communication is not in the operation, a check is made in step S001 if there is an active device driver (step S002) and, if there is an active device driver, the normal mode (operating clock: high) is retained for the device operation and the operating clock is not switched (step S005).

On the other hand, if it is judged in step S002 that there is no active device driver, the clock is switched (step S003) and the mode is moved to the power saving mode (step S004).

Figure 4:
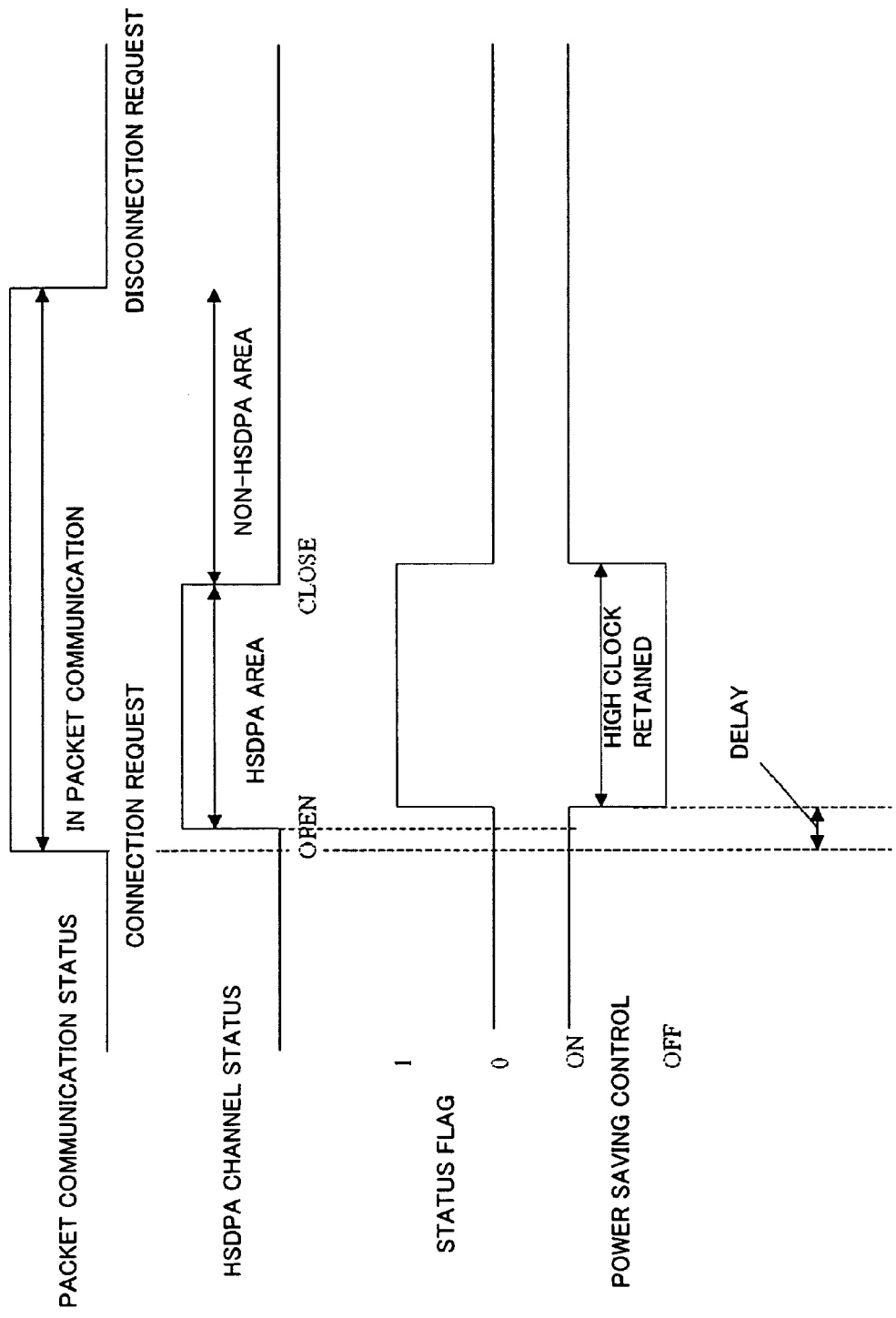
FIG. 4 is a diagram showing an actual operation of the mobile phone in the first exemplary embodiment of the present invention.

Next, the following describes in detail the actual operation of the mobile phone in this exemplary embodiment with reference to FIG. 4. First, when the mobile phone user performs an operation such as downloading, a packet connection request is sent to the network. FIG. 4 shows a case in which the mobile phone is in the HSDPA area when the packet communication is started and, after that, a handover occurs and the mobile phone leaves the HSDPA area.

When it is detected that the mobile phone is the HSDPA area, the protocol stack 16 of the CCPU 10 sends a channel establishment (OPEN) request to the ACPU 30 via the logical bus 20.

When the channel establishment (OPEN) request is received, the ACPU 30 updates the status flag 38a in the system monitoring unit 38 to "1" (=HSDPA communication is being carried out). Setting the flag to "1" prohibits the IDLE task from switching the operating clock as described above and the operating clock is retained in the high-speed mode.

On the other hand, when the mobile phone leaves the HSDPA area, the protocol stack 16 of the CCPU 10 sends the channel release (CLOSE) request. When the channel release (CLOSE) request is received, the ACPU 30 updates the status flag 38a in the system monitoring unit 38 to "0" (=non-HSDPA communication).

Setting the flag to "0" allows the IDLE task to switch the operating clock as described above. For example, if there is no active device driver, the operating clock is switched and the mobile phone is moved to the power saving mode. Of course, if a new task is generated, the mobile phone is returned to the normal mode.

Not only is the mobile phone moved to the power saving mode but also there is neither judgment processing nor interrupt generation during the HSDPA communication as described above, this exemplary embodiment allows the processing ability of the ACPU 30 to be dedicated to the processing involved in the high-speed data processing.

Second Exemplary Embodiment

Next, a second exemplary embodiment of the present invention will be described in which the operation of the first exemplary embodiment described above is modified. In the first exemplary embodiment described above, some delay is caused after the packet connection request is sent and before the status flag 38a in the system monitoring unit 38 is set to "1" as shown at the bottom of FIG. 4. To solve this problem, a status flag 38a in a system monitoring unit 38 is set to "1" in this exemplary embodiment at the same time the packet connection request is sent to prohibit the transition to the power saving mode in the initial state.

The other configuration is the same as that of the first exemplary embodiment described above. The following describes the actual operation of a mobile phone in this exemplary embodiment in detail with reference to FIG. 5 and FIG. 6.

First, when the mobile phone user performs the operation such as the download operation and a packet connection request is sent to the network, the ACPU 30 updates the status flag 38a in the system monitoring unit 38 to "1" (=HSDPA communication is being carried out).

Figure 5:
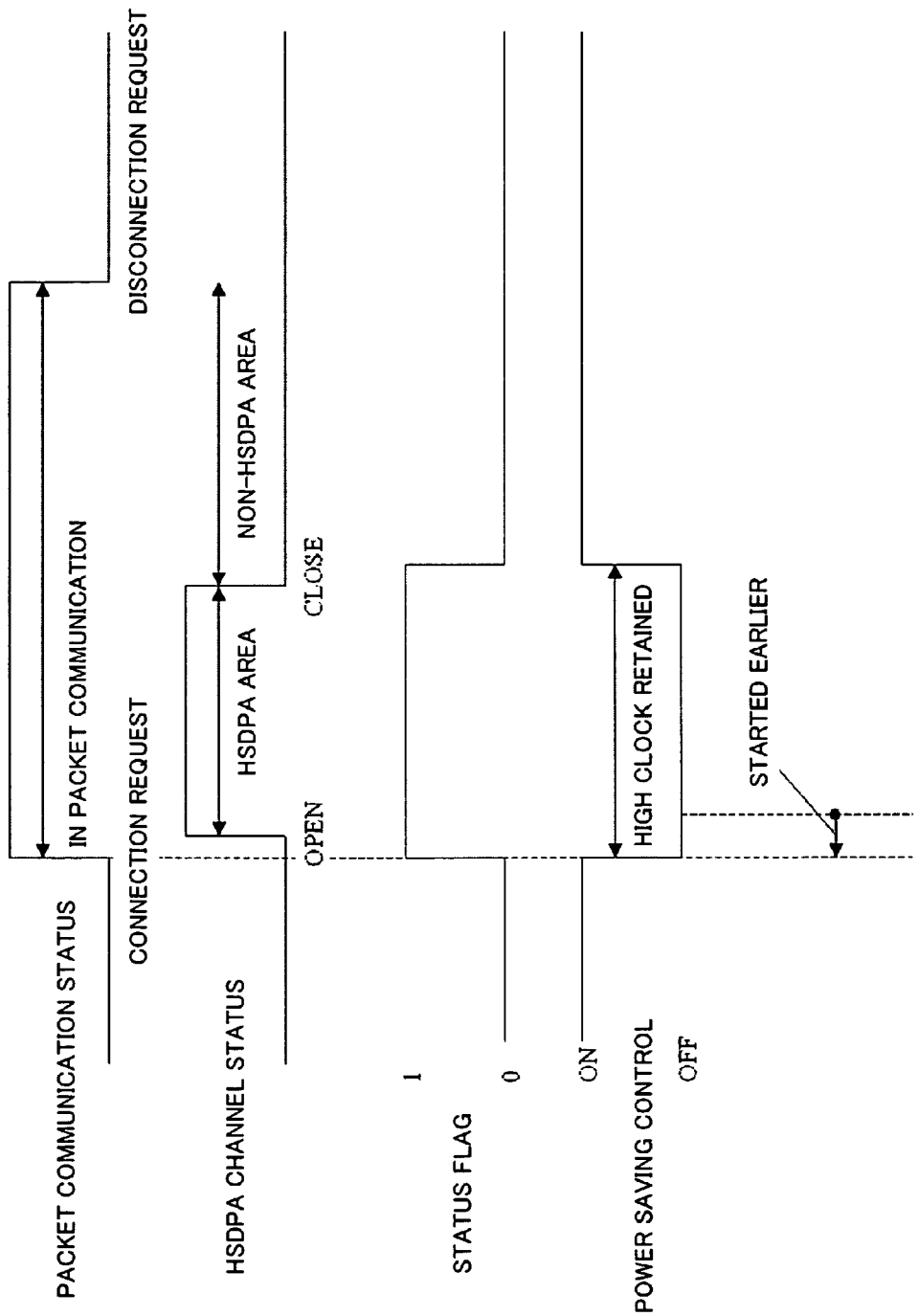
FIG. 5 is a diagram showing the actual operation of a mobile phone in a second exemplary embodiment of the present invention.

After that, the protocol stack 16 of the CCPU 10 detects that the mobile phone is in the HSDPA area and sends information indicating this fact. As in FIG. 4, FIG. 5 shows a case in which the mobile phone is in the HSDPA area when the packet communication is started and, after that, a handover occurs and the mobile phone leaves the HSDPA area. The comparison between FIG. 5 and FIG. 4 indicates that, in FIG. 5, the transition to the power saving mode is prohibited earlier; that is, the switching of the operating clock to the low speed is prohibited from the start of the packet communication.

Figure 6:
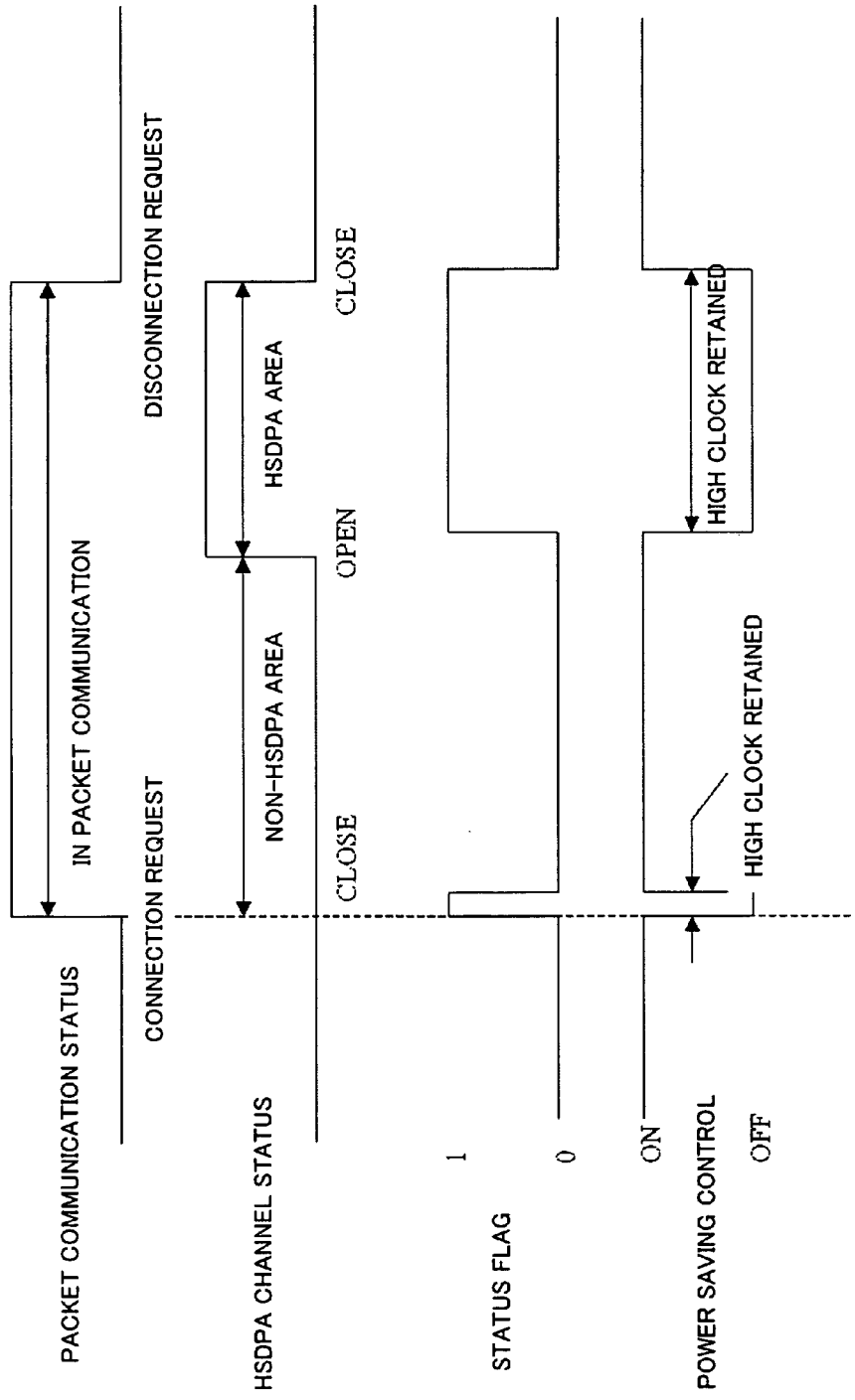
FIG. 6 is a diagram showing the actual operation of the mobile phone in the second exemplary embodiment of the present invention.
Figure 7:
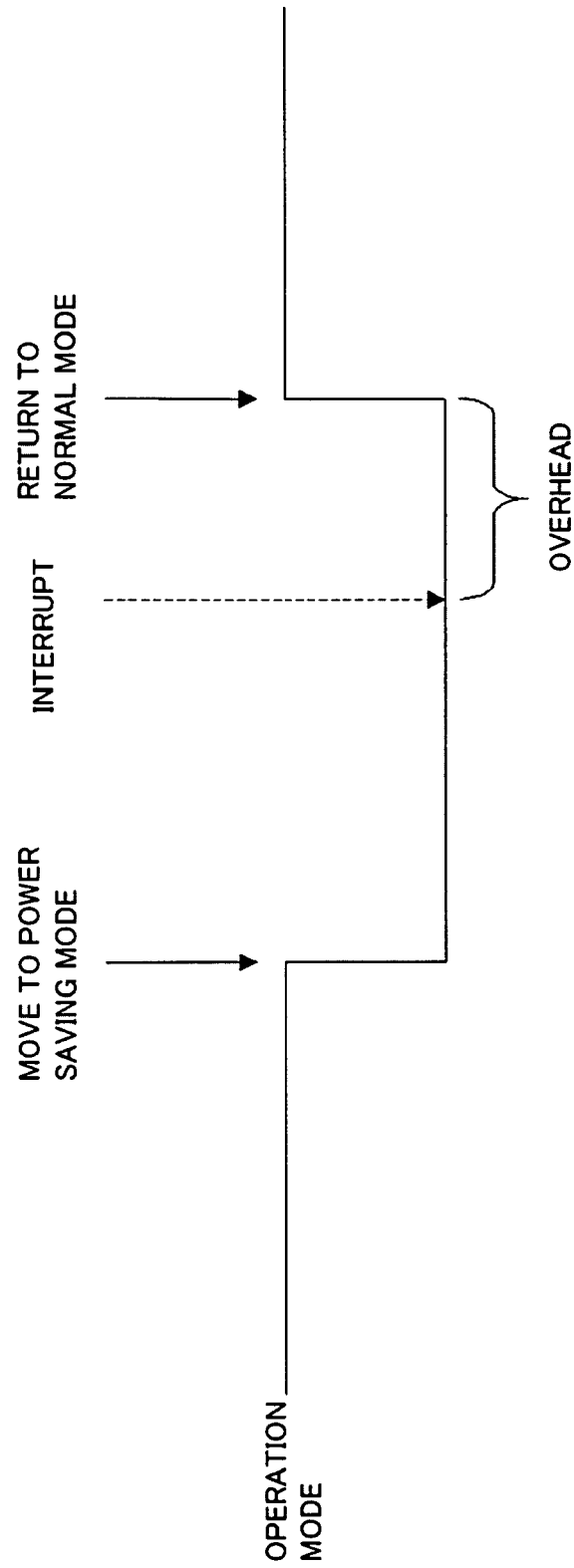
FIG. 7 is a diagram showing the problems of the prior art.
Figure 8:
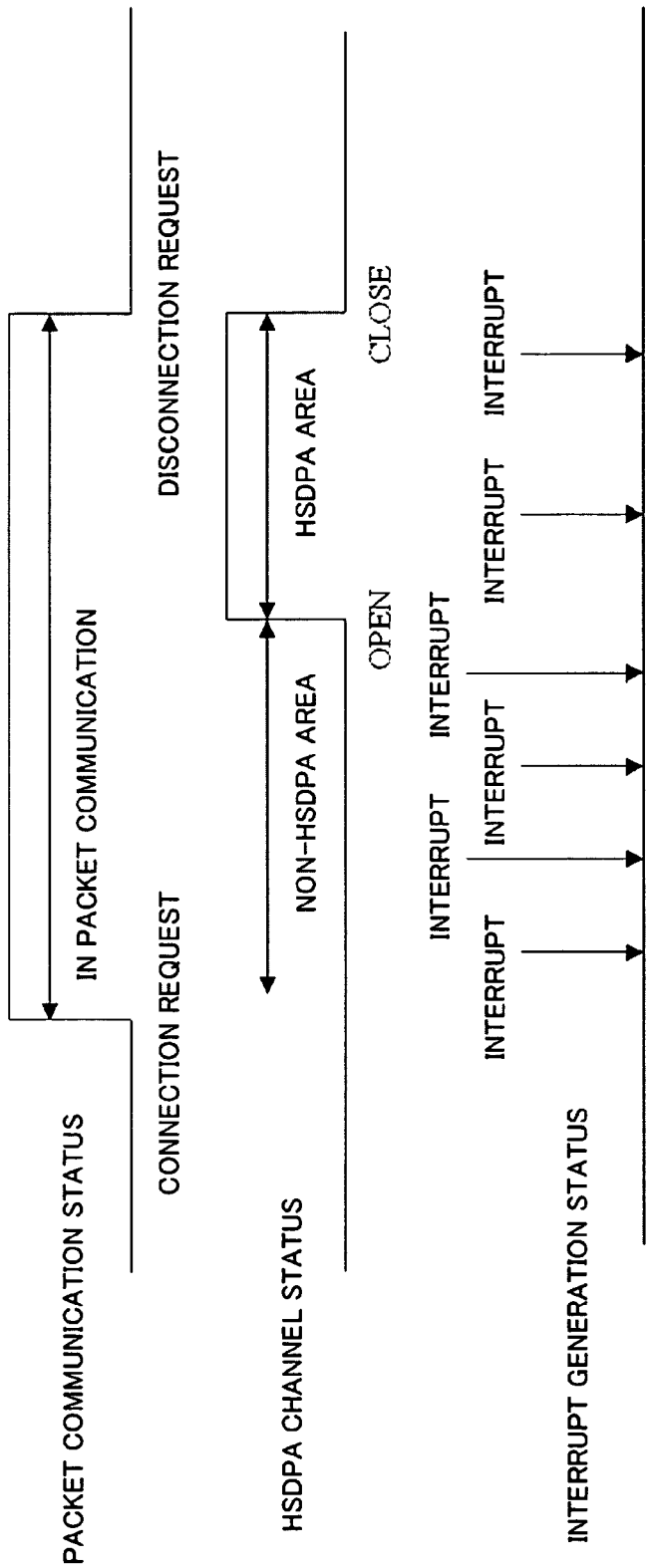
FIG. 8 is a diagram showing the problems of the prior art.

Unlike the case shown in FIG. 5, FIG. 6 shows a case in which the mobile phone is outside the HSDPA area when the packet communication is started and, after that, a handover occurs and the mobile phone enters the HSDPA area. In this case, too, the switching of the operating clock to the low speed is prohibited from the start of the packet communication, the transition to the power saving mode is permitted immediately after the information (CLOSE) indicating that the mobile phone leaves the HSDPA area is received from the protocol stack 16.

After that, when the information (OPEN) indicating that the mobile phone enters the HSDPA area is received from the protocol stack 16, the transition to the power saving mode is prohibited again. In this way, this exemplary embodiment also allows the processing ability of the ACPU 30 to be dedicated to the processing involved in the high-speed data processing in the same manner as the first exemplary embodiment described above.

While the present invention has been described with reference to the exemplary embodiments above, it is of course possible to add various modifications without departing from the spirit of the present invention that, when one of multiple communication methods with a higher data communication rate is selected, the power saving function is turned off to prohibit the operating clock from being switched to a lower speed.

For example, though the exemplary embodiments described have been described using examples in which an HSDPA-compatible mobile phone is used, the present invention is applicable not only to a mobile terminal that is carrying out the HSDPA communication but also to various types of wireless communication terminals having the multi-mode communication or function and the power saving control function that uses lower clock speeds, such as a PDA and a personal computer, wherein the multi-mode communication function may be off an existing wireless packet communication system (or method), HSUPA and the high-speed wireless LAN. The present invention may, of course, be implemented as the function to suppress the power saving control during high-speed communications on those devices.

Although the exemplary embodiments described above have been described using examples in which the start point of the prohibition of transition to the power saving mode is the time of detecting (entrance of) a mobile phone into the HSDPA area or the packet connection, any point in time, for example, a time after a predetermined period of time from the packet connection request sending time, may be used as the start point of the prohibition control of transition to the power saving mode in the scope described above.

Although the status flag 38a is used in the exemplary embodiments described above to control the operation mode of a mobile phone, it is of course possible to directly update an existing operation mode control flag.

The exemplary embodiments and the examples may be changed and adjusted in the scope of all disclosures (including claims) of the present invention and based on the basic technical concept thereof. In the scope of the claims of the present invention, various disclosed elements may be combined and selected in a variety of ways.

The invention claimed is:

1. A wireless communication terminal, comprising:
a processor that has a power saving control function for reducing an operating clock;
a wireless communication unit carrying out communication at a first data communication rate or at a second data communication rate, lower than the first data communication rate at a high or low data communication rate;
a communication processor that performs communication processing at the high or low, first or second data communication rate as said wireless communication unit; and
an application execution processor that executes tasks that process data received or sent via said communication processor as said processor,
wherein:
when communication is carried out at the high first data communication rate, the power saving control function of said processor is turned off,
when communication is carried out at the second data communication rate, the power saving control function of said processor is turned on,
when there is no task to be executed by said application execution processor, the power saving control function is implemented by said application execution processor moving to a power saving mode in which the operating clock is reduced;
said application execution processor prohibits a transition to the power saving mode when said communication processor is carrying out communication at the high-first data communication rate, and
said communication processor is a different and separate processor as compared to said application execution processor.

2. The wireless communication terminal as defined by claim 1 wherein said wireless communication terminal is compatible at least with HSDPA(High Speed Downlink Packet Access) communication and, during the HSDPA communication, the power saving control function of said processor is turned off.

3. The wireless communication terminal as defined by claim 1, wherein said wireless communication terminal is compatible at least with HSUPA(High Speed Uplink Packet Access) communication and, during the HSUPA communication, the power saving control function of said processor is turned off.

4. The wireless communication terminal as defined by claim 1, wherein the power saving control function is turned off at communication start time and, after that, the power saving control function is turned on when communication is started at the second data communication rate.

5. The wireless communication terminal as defined by claim 1, wherein the power saving control function is turned off at communication start time and, after that, the power saving control function is maintained off when communication is started at the high-first data communication rate.

6. The wireless communication terminal as defined by claim 1, wherein the power saving control function is turned on or off by rewriting a status flag that controls said processor.

7. The wireless communication terminal as defined by claim 1, wherein
the second data communication rate is lower than the first data communication rate, and
the second communication data rate is greater than zero.

8. A wireless communication terminal processor for use installed on a wireless communication terminal; said wireless communication terminal
a wireless communication unit carrying out communication at a first data comprising: communication rate or at a second data communication rate lower than the first data communication rate, at a high or low data communication rate, and that has a power saving control function for reducing an operating clock;
a communication processor that performs communication processing at the high or low, first or second data communication rate as said wireless communication unit; and
an application execution processor that executes tasks that process data received or sent via said communication processor as said processor,
wherein:
when communication is carried out at the high-first data communication rate, the power saving control function of said processor is turned off,
when communication is carried out at the second data communication rate, the power saving control function of said processor is turned on,
when there is no task to be executed for processing data received or sent via said communication processor, the power saving control function is implemented by moving to a power saving mode in which the operating clock is reduced,
a transition to the power saving mode is prohibited when said communication processor is carrying out communication at the high-first data communication rate, and
said communication processor is a different and separate processor as compared to said application execution processor that executes tasks that process data received or sent via said communication processor.

9. The wireless communication terminal processor as defined by claim 8, wherein said wireless communication terminal processor is compatible at least with HSDPA(High Speed Downlink Packet Access) communication and, during the HSDPA communication, the power saving control function is turned off.

10. The wireless communication terminal processor as defined by claim 8, wherein said wireless communication terminal processor is compatible at least with HSUPA(High Speed Uplink Packet Access) communication and, during the HSUPA communication, the power saving control function is turned off.

11. The wireless communication terminal processor as defined by claim 8, wherein the power saving control function is turned off at communication start time and, after that, the power saving control function is turned on when communication is started at the second data communication rate.

12. The wireless communication terminal processor as defined by claim 8, wherein the power saving control function is turned off at communication start time and, after that, the power saving control function is maintained off when communication is started at the high-first data communication rate.

13. The wireless communication terminal processor as defined by claim 8, wherein the power saving control function is turned on or off by rewriting a status flag that controls said processor.

14. A power management method for use on a wireless communication terminal comprising a processor that has a power saving control function for reducing an operating clock under a predetermined condition; a wireless communication unit carrying out communication at a first data communication rate or at a second data communication rate lower than the first data communication rate at a high or low data communication rate, a communication processor that performs communication processing at the high or low first or second data communication rate as said wireless communication unit; and an application execution processor that executes tasks that process data received or sent via said communication processor as said processor, wherein:
said processor recognizes a data communication rate of said wireless communication unit, when said wireless communication unit carries out communication at the high first data communication rate, the power saving control function of said processor is turned off, when communication is carried out at the second data communication rate, the power saving control function of said processor is turned on, when there is no task to be executed by said application execution processor, the power saving control function is implemented by said application execution processor moving to a power saving mode in which the operating clock is reduced, said application execution processor prohibits a transition to the power saving mode when said communication processor is carrying out communication at the high-first data communication rate, and said communication processor is a different and separate processor as compared to said application execution processor.

15. The power management method for use on a wireless communication terminal as defined by claim 14, wherein said processor turns off the power saving control function at communication start time and, after that, turns on the power saving control function when communication is started at the second data communication rate.

16. The power management method for use on a wireless communication terminal as defined by claim 14, wherein said processor turns off the power saving control function at communication start time and, after that, keeps the power saving control function off when communication is started at the high-first data communication rate.

* * * * *